United States Patent
Yoshida et al.

(10) Patent No.: US 10,211,944 B2
(45) Date of Patent: Feb. 19, 2019

(54) STATION-SIDE DEVICE AND COMMUNICATION METHOD

(71) Applicant: NIPPON TELEGRAPH AND TELEPHONE CORPORATION, Tokyo (JP)

(72) Inventors: Tomoaki Yoshida, Tsukuba (JP); Shigeru Kuwano, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 15/576,656

(22) PCT Filed: May 24, 2016

(86) PCT No.: PCT/JP2016/065305
§ 371 (c)(1),
(2) Date: Nov. 22, 2017

(87) PCT Pub. No.: WO2016/190302
PCT Pub. Date: Dec. 1, 2016

(65) Prior Publication Data
US 2018/0145788 A1 May 24, 2018

(30) Foreign Application Priority Data
May 26, 2015 (JP) ................. 2015-106276

(51) Int. Cl.
*H04L 12/44* (2006.01)
*H04J 14/02* (2006.01)
(Continued)

(52) U.S. Cl.
CPC ...... *H04J 14/0246* (2013.01); *H04J 14/0282* (2013.01); *H04J 14/086* (2013.01); *H04L 12/44* (2013.01); *H04Q 11/0067* (2013.01)

(58) Field of Classification Search
CPC .................................. H04Q 11/0067
See application file for complete search history.

(56) References Cited

U.S. PATENT DOCUMENTS

2009/0245790 A1* 10/2009 Mizutani ............... H04J 3/0682
398/43
2013/0094862 A1 4/2013 Luo et al.
(Continued)

FOREIGN PATENT DOCUMENTS

| JP | 2014-171033 A | 9/2014 |
| WO | WO-2014/131352 A1 | 9/2014 |
| WO | WO-2014-183504 A1 | 11/2014 |

OTHER PUBLICATIONS

International Search Report (in English and Japanese) of the International Searching Authority issued in PCT/JP2016/065305, dated Jul. 19, 2016, ISA/JPO.

(Continued)

*Primary Examiner* — David Payne
*Assistant Examiner* — Omar S Ismail
(74) *Attorney, Agent, or Firm* — Harness, Dickey & Pierce, P.L.C.

(57) ABSTRACT

A station-side device performs transmission and reception of an optical signal to and from a subscriber-side device, and includes a communication control unit configured to perform optical signal communication using a plurality of wavelengths by wavelength division multiplexing and time division multiplexing; and a registration unit configured to set an acceptance period in at least one wavelength among the plurality of wavelengths, to perform a new registration of a subscriber-side device in response to a registration request of the subscriber-side device received within the acceptance period, and not to set the acceptance period in at least one other wavelength among the plurality of wavelengths.

6 Claims, 7 Drawing Sheets

(51) Int. Cl.
*H04J 14/08* (2006.01)
*H04Q 11/00* (2006.01)

(56) References Cited

U.S. PATENT DOCUMENTS

| | | |
|---|---|---|
| 2014/0233944 A1 | 8/2014 | Vetter et al. |
| 2014/0248053 A1 | 9/2014 | Tamai |
| 2015/0055955 A1 | 2/2015 | Kim et al. |
| 2016/0087748 A1* | 3/2016 | Khotimsky .......... H04B 10/272 398/67 |

OTHER PUBLICATIONS

ITU-T G.987.3, "Transmission Systems and Media, Digital Systems and Networks Digital sections and digital line system—Optical line systems for local and access networks / 10-Gigabit-capable passive optical networks(XG-PON): Transmission convergence (TC) layer specification", 2010.

Shigeru Kuwano, Requirement and Technical Issues on Mobile Optical Network, IEICE Society Conference, BT-1-2, Sep. 2014 (Partial Translation).

Luo, Y. et al., Wavelength management in time and wavelength division multiplexed passive optical networks (TWDM-PONs), Global Communications Conference (GLOBECOM), 2012 IEEE, 2012, pp. 2971-2976.

Li Jun et al: "Adaptive registration in TWDM-PON with ONU migrations", Journal of Optical Communications and Networking, Institute of Electrical and Electronics Engineers, US, vol. 6, No. 11, Nov. 1, 2014, pp. 943-951.

Extended European Search Report in related application EP 16800007.3, EPO, Munich, dated Nov. 14, 2018.

\* cited by examiner

STATION-SIDE DEVICE AND COMMUNICATION METHOD

CROSS-REFERENCE TO RELATED APPLICATIONS

This application is a 371 U.S. National Stage of International Application No. PCT/JP2016/065305, filed May 24, 2016. This application claims the benefit of and priority to Japanese Patent Application No. 2015-106276, filed May 26, 2015. The disclosures of the above applications are incorporated herein by reference.

TECHNICAL FIELD

The present invention relates to a station-side device and a communication method in a passive optical network (PON) system.

BACKGROUND ART

In the related art, in a passive optical network (PON) (see Non-Patent Document 1 and Non-Patent Document 2) which adopts a time division multiple access (TDMA) scheme, an optical line terminal (OLT) as a station-side device sets Quiet Window (an acceptance period) as a time during which it waits for the arrival of an uplink Serial_Number_ONU PLOAM frame which is a registration request signal from an unregistered optical network unit (ONU) as a subscriber-side device at the time of initial connection (referred to as "activation").

Figure 7:
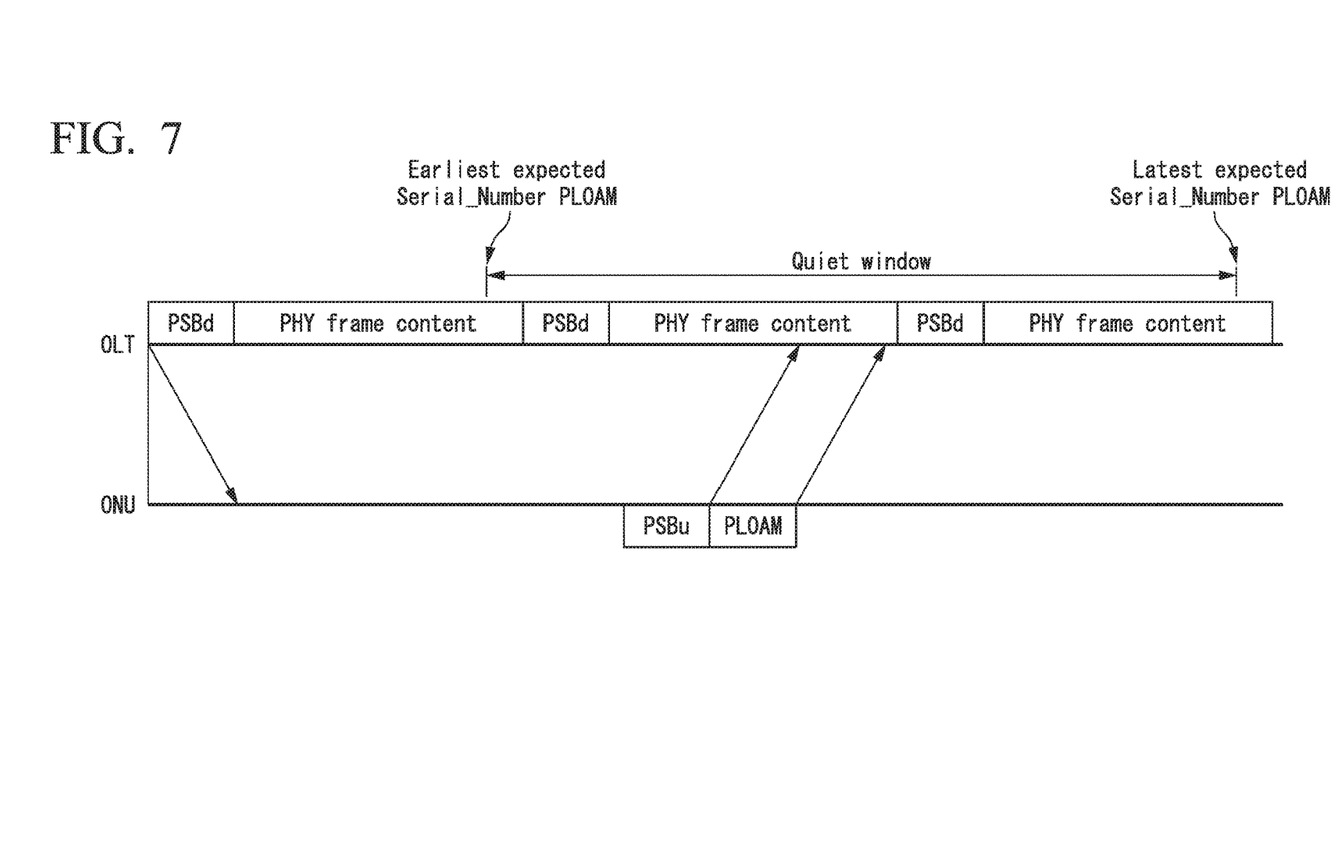
FIG. 7 is a diagram schematically showing a conventional communication method.

FIG. 7 is a diagram schematically showing a conventional communication method. In the PON of the conventional TDMA system, as shown in FIG. 7, an optical signal is transmitted and received in a time division manner using each frame (PHY frame). For registration of a new ONU, Quiet Window is set in the OLT. During the period of Quiet Window, the OLT waits for a Serial_Number_ONU PLOAM from a new ONU with an unknown round-trip propagation delay and therefore the OLT controls uplink signal transmission of ONUs so as not to receive uplink signals from registered ONUs. The new ONU transmits the Serial_Number_ONU PLOAM as a registration request signal within Quiet Window. Upon receiving the Serial_Number_ONU PLOAM, the OLT starts a process of registering the ONU that has transmitted this Serial_Number_ONU PLOAM.

A similar initial connection procedure is specified in an EPON defined in IEEE 802.3. In this specification, an equivalent to Quiet Window is referred to as Discovery Window. Also in this specification, during the Discovery Window period, the OLT controls uplink signal transmission of ONUs so as not to receive uplink signals from registered ONUs.

In Non-Patent Document 1, the OLT measures the reception time of the Serial_Number_ONU, calculates an equalization delay (EqD) which is a virtual delay time for synchronizing the round trip propagation delay between the OLT and the ONU with the start position of the uplink frame of the ONU, and notifies the ONU of the calculated EqD using a Ranging_Time PLOAM. It is assumed that the same scheme is inherited by a PON (for example, ITU-T G989.3) which combines wavelength multiplexing and time division multiplexing, of which standardization is being promoted as the next access technology.

DOCUMENT OF PRIOR ART

Non-Patent Document

[Non-Patent Document 1]
ITU-T G.987.3, "TRANSMISSION SYSTEMS AND MEDIA, DIGITAL SYSTEMS AND NETWORKS Digital sections and digital line system—Optical line systems for local and access networks/10-Gigabit-capable passive optical networks (XG-PON): Transmission convergence (TC) layer specification"

[Non-Patent Document 2]
Kuwano, "Requirements and Technical Issues on Mobile Optical Network," Communications Society Conference of the Institute of Electronics, Information and Communication Engineers, BT-1-2, September 2014

SUMMARY OF INVENTION

Technical Problem

As described above, in the conventional TDM-PON, the OLT sets Quiet Window or Discovery Window at the time of initial connection and waits for a registration request signal (Serial_Number_ONU PLOAM in Non-Patent Document 1) of the ONU for initial connection. This Quiet Window is defined as a period determined from minimum and maximum distances (a period from Earliest expected Serial_Number PLOAM to Latest expected Serial_Number PLOAM) as shown in FIG. 7 since it is unknown at which timing a registration request signal from an unregistered ONU will arrive.

Figure 8:
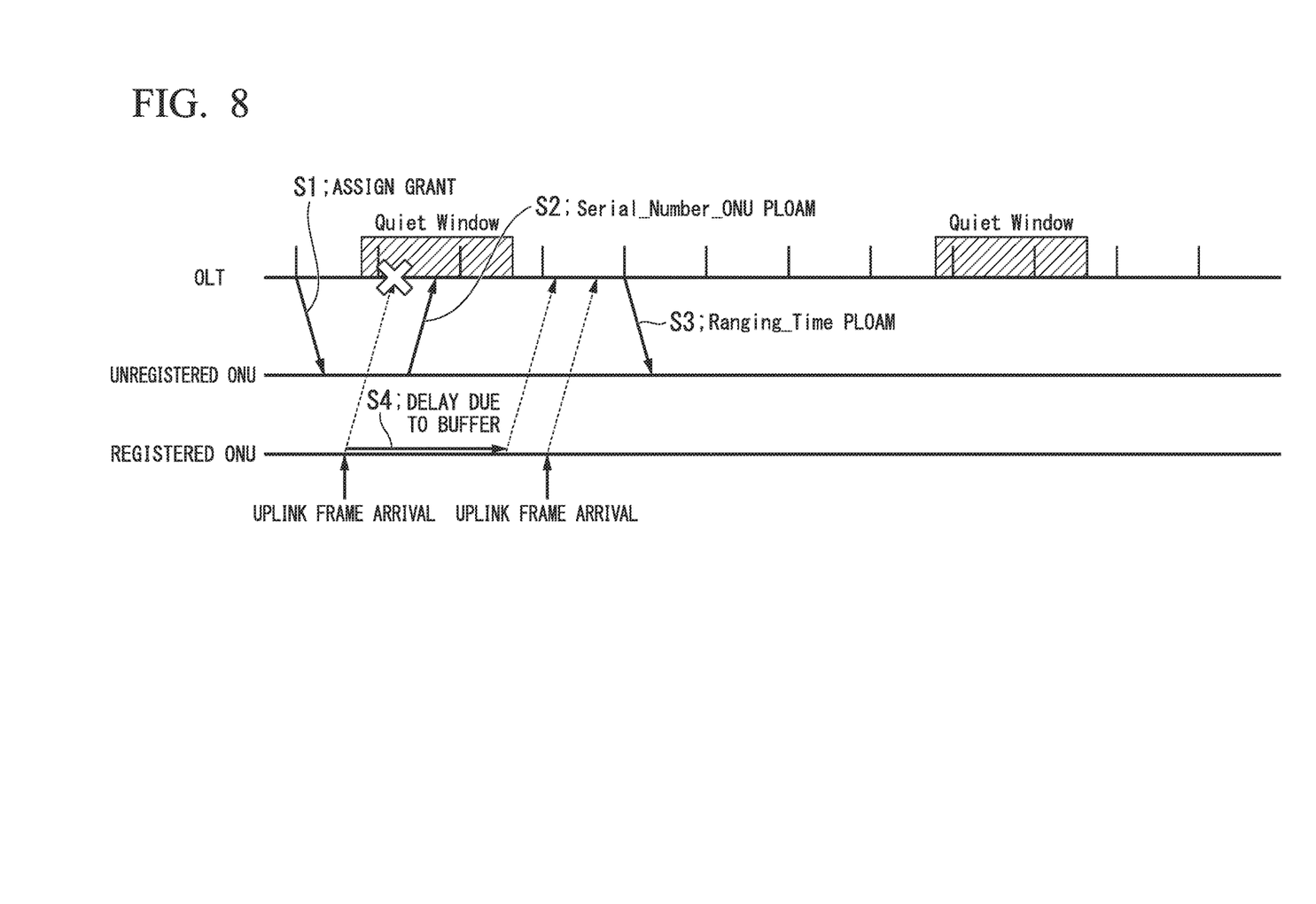
FIG. 8 is a diagram schematically showing a conventional communication method.

FIG. 8 is a diagram schematically showing a conventional communication method. As described above, during a period in which the Window is set, the OLT performs control so as not to receive normal uplink signals from other registered ONUs. For this reason, as shown in FIG. 8, during the period in which the Window is set, a registered ONU is in a state in which it cannot output uplink signals. An uplink signal arriving at the ONU during this period is queued in a buffer in the ONU.

In FIG. 8, the OLT sets Quiet Window at regular intervals. The OLT also transmits an uplink grant for initial connection (a frame for specifying the timing to transmit Serial_number_ONU PLOAM) (process S1).

In response to the uplink grant, the unregistered ONU transmits a registration request signal (Serial_Number_ONU PLOAM) such that it arrives within Quiet Window (process S2) and issues an initial connection start request. Upon receiving the registration request signal (Serial_Number_ONU PLOAM) from the unregistered ONU, the OLT starts a process of registering the ONU. The OLT also measures the reception time of the Serial_Number_ONU and calculates an Equalization Delay (EqD) which is a virtual delay time for synchronizing the round trip propagation delay between the OLT and the ONU with the start position of the uplink frame of the ONU. The OLT then notifies the ONU of the EqD using a Ranging_Time PLOAM (process S3).

On the other hand, the registered ONU cannot transmit a signal of an uplink frame during the period corresponding to Quiet Window. Therefore, as shown in FIG. 8, an uplink signal arriving at the ONU in the period corresponding to Quiet Window is queued in the buffer in the ONU (process S4). The uplink signal queued in this buffer is transmitted after Quiet Window ends, thus causing a delay corresponding to this period.

As described above, in the PON of the conventional TDMA system, an uplink signal is delayed in a period corresponding to Quiet Window. Although the OLT can set the intervals at which Quiet Window is set, it is recommended according to Non-Patent Document 1 that the period of Quiet Window itself be 250 μsec if the distance difference from the OLT to the ONU is 20 km and 450 μsec if the distance difference is 40 km. That is, in the PON of the conventional TDMA system, opening the Quiet Window causes delay fluctuations of 250 μsec to 450 μsec in uplink signals. Therefore, as shown in Non-Patent Document 2, the conventional TDMA PON has a problem that it is difficult to apply the TDMA PON to mobile fronthaul (WE) or the like which has strict requirements for delay or delay fluctuation.

In view of the above circumstances, it is an object of the present invention to provide a technology for reducing communication delay or delay fluctuations.

Solution to Problem

A first aspect of the present invention is a station-side device performing transmission and reception of an optical signal to and from a subscriber-side device, and including a communication control unit configured to perform optical signal communication using a plurality of wavelengths by wavelength division multiplexing and time division multiplexing, and a registration unit configured to set an acceptance period in at least one wavelength among the plurality of wavelengths, to perform a new registration of a subscriber-side device in response to a registration request of the subscriber-side device received within the acceptance period, and not to set the acceptance period in at least one other wavelength among the plurality of wavelengths.

According to a second aspect of the present invention, in the station-side device according to the first aspect, the registration unit is configured to set the acceptance period in a wavelength having a margin in terms of a delay requirement among the plurality of wavelengths.

According to third aspect of the present invention, in the station-side device according to the first or second aspect, the registration unit is configured not to set the acceptance period in a wavelength having no margin in terms of a delay requirement among the plurality of wavelengths.

According to a fourth aspect of the present invention, in the station-side device according to any one of the first to third aspects, the communication control unit is configured to transmit a wavelength switching instruction for switching a wavelength to the at least one other wavelength to the subscriber-side device after the new registration of the subscriber-side device.

According to a fifth aspect of the present invention, in the station-side device according to any one of the first to fourth aspects, when the subscriber-side device uses a wavelength at which the acceptance period is not set, the communication control unit is configured to transmit a wavelength switching instruction for switching a wavelength to the wavelength at which the acceptance period is not set.

According to sixth aspect of the present invention, in the station-side device according to any one of the first to fifth aspects, the station-side device is configured to switch a wavelength at which the acceptance period is set.

A seventh aspect of the present invention is a communication method performed by a station-side device configured to perform transmission and reception of an optical signal to and from a subscriber-side device, and including a communication step including performing optical signal communication using a plurality of wavelengths by wavelength division multiplexing and time division multiplexing, and a registration step including setting an acceptance period in at least one wavelength among the plurality of wavelengths, performing a new registration of a subscriber-side device in response to a registration request of the subscriber-side device received within the acceptance period, and not setting the acceptance period in at least one other wavelength among the plurality of wavelengths.

Advantageous Effects of Invention

According to the present invention, it is possible to reduce communication delay or delay fluctuations.

DESCRIPTION OF EMBODIMENTS

First Embodiment

Figure 1:
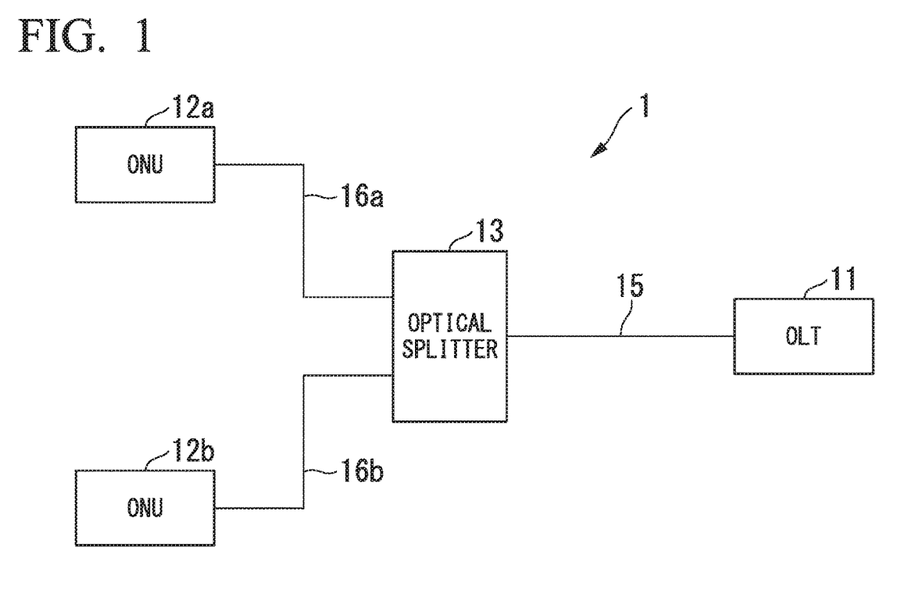
FIG. 1 is a diagram showing a configuration of an optical communication system according to a first embodiment of the present invention.

Hereinafter, embodiments of the present invention will be described with reference to the drawings. FIG. 1 is a diagram showing a configuration of an optical communication system 1 according to a first embodiment of the present invention. As shown in FIG. 1, the optical communication system 1 according to the first embodiment of the present invention includes an optical line terminal (OLT) 11 as a station-side device, a plurality of optical network units (ONUs) 12 (12a and 12b) as subscriber-side devices, and an optical splitter 13. The OLT 11 is installed, for example, at a center station. The OLT 11 and the optical splitter 13 are connected by an optical fiber 15. The ONUs are installed, for example, in subscribers' houses. The ONUs 12 (12a and 12b) and the optical splitter 13 are connected by an optical fiber 16a and an optical fiber 16b.

Although only two ONUs 12 (12a and 12b) among a plurality of ONUs are illustrated in FIG. 1, a plurality of ONUs may be further installed in the optical communication system 1. In the following description, communication from the ONU 12a and the ONU 12b to the OLT 11 is referred to as uplink and communication from the OLT 11 to the ONU 12a and the ONU 12b is referred to as downlink.

Figure 2:
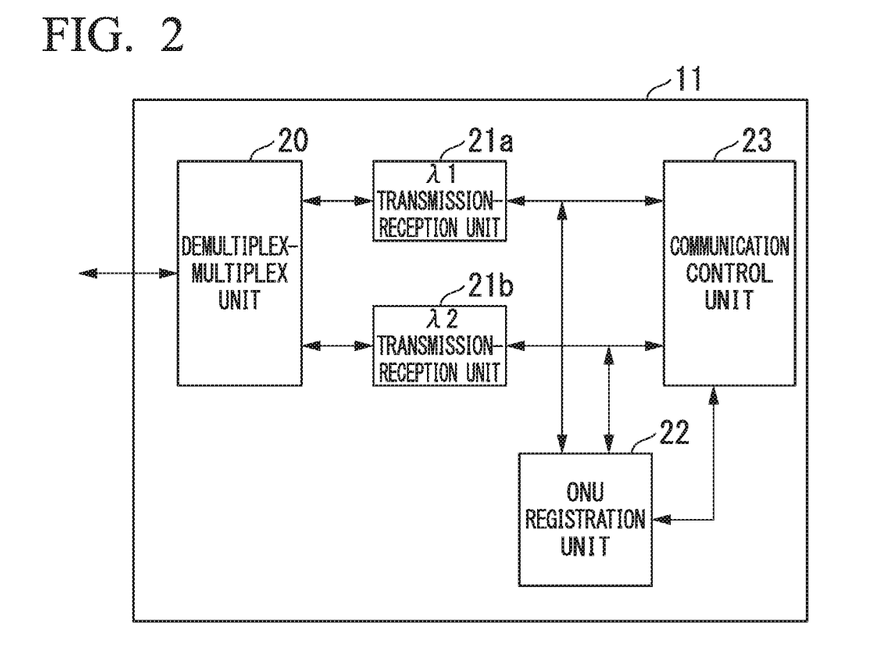
FIG. 2 is a block diagram showing a schematic configuration of an OLT according to the first embodiment.

FIG. 2 is a block diagram showing a schematic configuration of the OLT 11. As shown in FIG. 2, the OLT 11 includes a demultiplex-multiplex unit 20, transmission-reception units 21a and 21b, an ONU registration unit 22, and a communication control unit 23.

The demultiplex-multiplex unit 20 performs demultiplexing and multiplexing of optical signals of a plurality of wavelengths (for example, wavelengths λ1 and λ2). The transmission-reception unit 21a and the transmission-reception unit 21b perform transmission and reception of optical signals of wavelength λ1 and wavelength λ2, respectively.

The ONU registration unit 22 performs processes for new registration of ONUs. A process of newly registering an ONU is performed by setting Quiet Window at the time of initial connection and receiving a registration request signal (Serial_Number_ONU PLOAM) sent from the new ONU in a period during which Quiet Window is opened. In addition, in the first embodiment, the wavelength in which Quiet Window is set can be determined to be at least one wavelength(s) selected from a plurality of wavelengths used for transmitting and receiving optical signals. That is, in the first embodiment, it is possible to use two wavelengths, i.e., the wavelength λ1 and the wavelength λ2. In this case, the wavelength in which Quiet Window is set may be determined to be both λ1 and λ2 or may be determined to be one of λ1 and λ2. The wavelength in which Quiet Window is set may be switched between λ1 and λ2.

The communication control unit 23 performs optical signal transmission-reception processes by a wavelength division multiplex (WDM)/time division multiplex (TDM)-passive optical network (PON). In the WDM/TDM-PON, each ONU performs communication using a specific wavelength which has been previously allocated. Time slots are dynamically allocated to each ONU using a specific wavelength. In this example, the two wavelengths λ1 and λ2 are used but a plurality of wavelengths may also be used.

Figure 3:
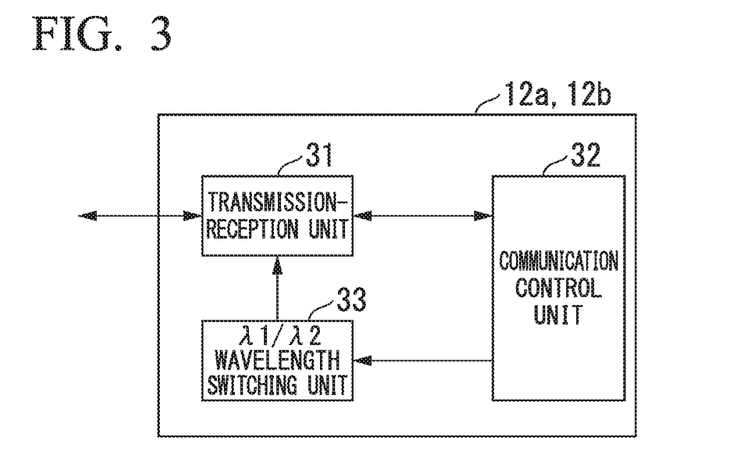
FIG. 3 is a block diagram showing a configuration of an ONU according to the first embodiment.

FIG. 3 is a block diagram showing a configuration of each of the ONU 12a and the ONU 12b. As shown in FIG. 3, each of the ONU 12a and the ONU 12b includes a transmission-reception unit 31, a communication control unit 32, and a wavelength switching unit 33.

The transmission-reception unit 31 performs transmission and reception of optical signals. The communication control unit 32 performs transmission-reception processes of optical signals by the WDM/TDM-PON. The wavelength switching unit 33 performs switching of wavelengths used for transmission and reception by the transmission-reception unit 31. In this example, the transmission-reception unit 31 may switch between the wavelength λ1 and the wavelength λ2 by the wavelength switching unit 33 and transmit and receive optical signals.

Next, an ONU registration process in the optical communication system 1 according to the first embodiment of the present invention will be described with reference to FIG. 4.

Figure 4:
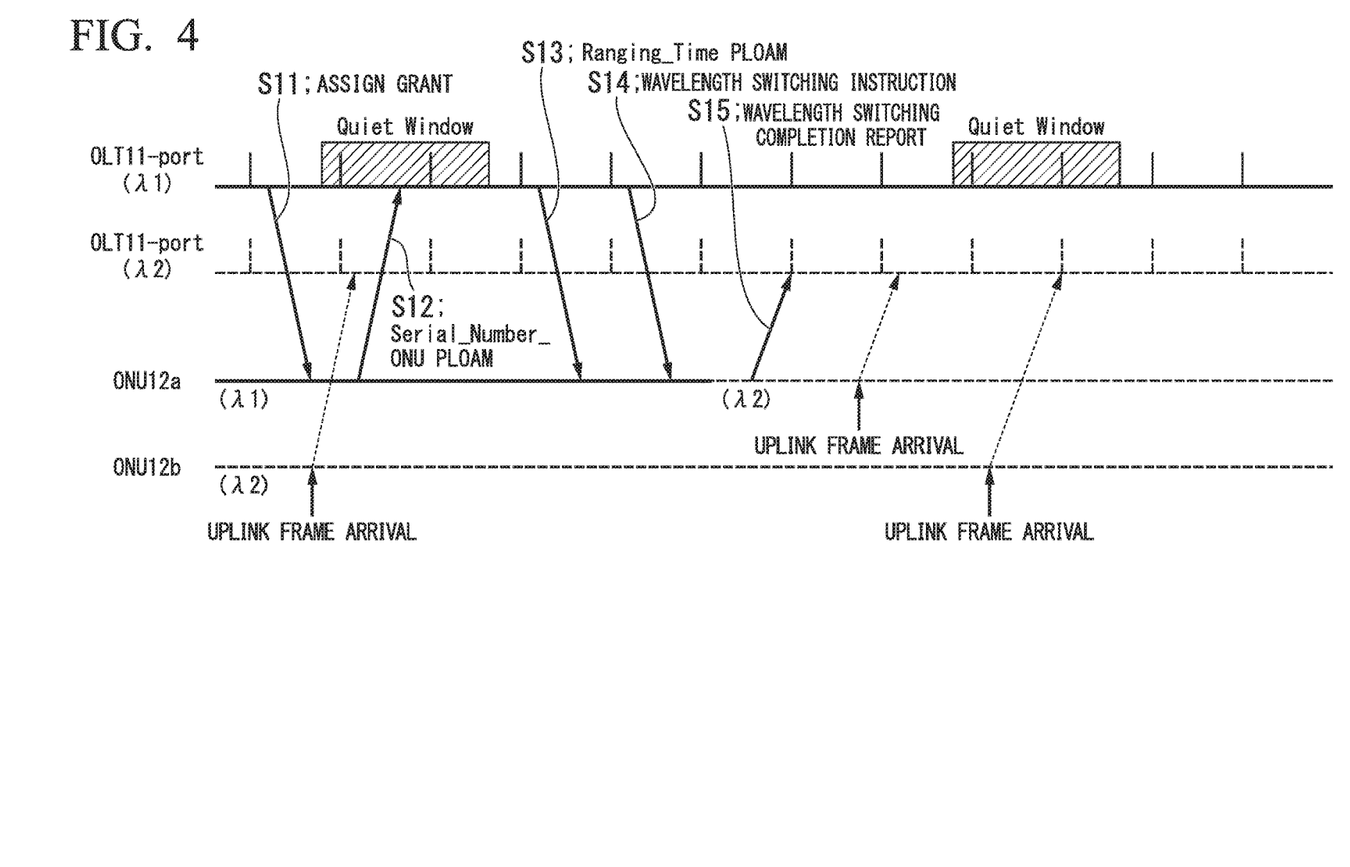
FIG. 4 is a sequence diagram of an ONU registration process in the optical communication system according to the first embodiment.

FIG. 4 is a sequence diagram of an ONU registration process in the optical communication system 1 according to the first embodiment of the present invention. Here, the ONU 12a is unregistered and the ONU 12b is registered. The wavelengths λ1 and λ2 can be used as wavelengths for transmitting and receiving optical signals. The wavelength λ2 is used for providing a service which has strict delay requirements. The wavelength λ1 may be used for a service which does not have strict delay requirements or may not be used to provide a communication service. In the first embodiment, it is assumed that, similar to the registered ONU 12b, the unregistered ONU 12a is accommodated at the wavelength λ2 for providing a service which has strict delay requirements.

In FIG. 4, the OLT 11 sets Quiet Window at regular intervals. Here, as shown in FIG. 4, the OLT 11 does not set Quiet Window at a port of the wavelength λ2 which has strict delay requirements (for example, at the λ2 transmission-reception unit 21b in FIG. 2) but sets Quiet Window only at a port of the wavelength λ1 (for example, at the λ1 transmission-reception unit 21a in FIG. 2).

The OLT 11 transmits an uplink grant for initial connection through the port of wavelength λ1 (process S11). The uplink grant is a frame for specifying the timing to transmit a Serial_number_ONU PLOAM. The unregistered ONU 12a is set to perform transmission and reception of the wavelength λ1. Therefore, in response to the uplink grant, the unregistered ONU 12a transmits a registration request signal (Serial_Number_ONU PLOAM) such that it arrives within Quiet Window (process S12) and issues an initial connection start request.

Any method may be used to set the transmission-reception wavelength of the unregistered ONU 12a to λ1. For example, it is possible to preset the initial connection wavelength as λ1 in the unregistered ONU 12a or it is also possible to use a method in which the unregistered ONU 12a sweeps wavelengths used in the WDM/TDM-PON in predetermined cycles and searches for a grant given for initial connection. In this case, the OLT 11 need not transmit an uplink grant for initial connection.

Upon receiving the registration request signal (Serial_Number_ONU PLOAM) from the ONU 12a through the wavelength λ1, the OLT 11 performs registration of the ONU 12a. Then, the OLT 11 transmits a Ranging_Time PLOAM describing an equalization delay (EqD) which is a virtual delay time (process S13) and accommodates the ONU 12a at the wavelength λ1.

Next, the communication control unit 23 of the OLT 11 transmits a wavelength switching instruction for switching a wavelength to the wavelength λ2 to the ONU 12a through the port of the wavelength λ1 (process S14). Upon receiving the wavelength switching instruction, the ONU 12a switches the wavelength to be used from λ1 to λ2, transmits a wavelength switching completion report to the OLT 11 (process S15), and starts communication. Thereafter, like the ONU 12b, the ONU 12a is accommodated at the wavelength λ2 and performs optical communication with the OLT 11. Here, the wavelength switching instruction and the wavelength switching completion report are delivered in a frame having a short length such as a PLOAM. Thus, this does not become a factor causing a great delay or delay fluctuations like Quiet Window.

As described above, in the first embodiment, Quiet Window is set only at the wavelength λ1 and no Quiet Window is set at the wavelength λ2 which has strict delay requirements. This allows the ONU 12b which is already accommodated at the wavelength λ2 to output an uplink signal even while the Quiet Window is open, thereby eliminating delay or delay fluctuations of uplink signals caused by the Quiet Window.

In the first embodiment, after the new ONU 12a is registered, a wavelength switching instruction for switching a wavelength to a desired wavelength λ2 is transmitted from the OLT 11 to the ONU 12a and the wavelength of the ONU 12a is switched from λ1 to λ2. This allows the new ONU 12a to be accommodated at the wavelength λ2, similar to the ONU 12b.

In the above example, two different wavelengths λ1 and λ2 are used for communication, but a plurality of different wavelengths may also be used. Further, in the above example, Quiet Window is set only at one wavelength 1, but Quiet Window may be set at a plurality of wavelengths. Furthermore, in the above example, no Quiet Window is set at one wavelength $\lambda 2$, but no Quiet Window may be set at a plurality of wavelengths. In short, rather than setting Quiet Window for all wavelengths used for communication, it is important to set Quiet Window only for partial wavelengths excluding wavelengths which have strict delay requirements. Any method may be used to set the period and intervals at which Quiet Window is opened.

Although this procedure is described based on procedures described in ITU-T G987.3, it is also possible to apply the procedure to those described in IEEE 802.3 which opens Discovery Window instead of Quiet Window. That is, the same operation is performed by replacing the uplink grant provided for initial connection with a Discovery Gate frame, the Serial_Number_ONU PLOAM with a Register Request frame, and the Ranging_Time PLOAM with a Resister frame.

Second Embodiment

Figure 5:
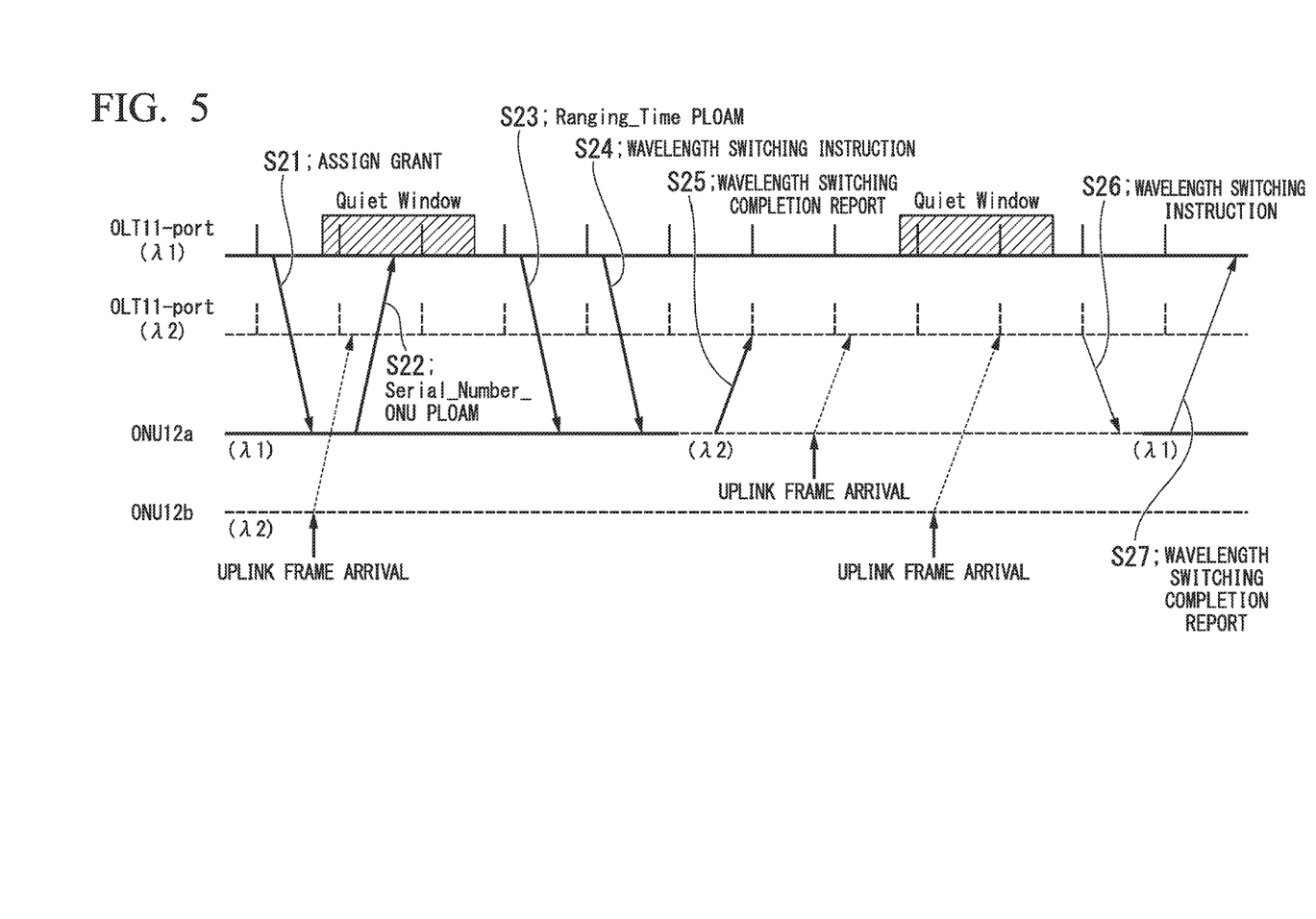
FIG. 5 is a sequence diagram of an ONU registration process in an optical communication system according to a second embodiment of the present invention.

Next, a second embodiment of the present invention will be described. FIG. 5 is a sequence diagram of an ONU registration process in the optical communication system 1 according to the second embodiment of the present invention.

Similar to the above-described first embodiment, it is assumed that the ONU 12a is unregistered and the ONU 12b is registered. It is also assumed that wavelengths $\lambda 1$ and $\lambda 2$ are used as wavelengths for transmitting and receiving optical signals and the wavelength $\lambda 2$ is used for providing a service which has strict delay requirements. It is also assumed that the wavelength $\lambda 1$ is used for providing a service which does not have strict delay requirements.

In the first embodiment described above, it is assumed that the unregistered ONU 12a is accommodated at the wavelength $\lambda 2$ for providing a service which has strict delay requirements, similar to the registered ONU 12b. On the other hand, in the second embodiment, it is assumed that the unregistered ONU 12a is accommodated at the wavelength $\lambda 1$ to be used for a service which does not have strict delay requirements.

In FIG. 5, the OLT 11 sets Quiet Window at regular intervals. Here, as shown in FIG. 5, the OLT 11 does not set Quiet Window at the wavelength $\lambda 2$ which has strict delay requirements but sets Quiet Window only at the wavelength $\lambda 1$ having a margin in terms of delay requirements.

The OLT 11 transmits an uplink grant for initial connection (a frame for specifying the timing to transmit Serial_number_ONU PLOAM) through a port of the wavelength $\lambda 1$ (process S21). The unregistered ONU 12a is set to perform transmission and reception of the wavelength $\lambda 1$ and transmits, in response to an uplink grant, a registration request signal (Serial_Number_ONU PLOAM) such that it arrives within the Quiet Window (process S22) and issues an initial connection start request.

Any method may be used to set the transmission-reception wavelength of the unregistered ONU 12a to $\lambda 1$. For example, it is possible to preset the initial connection wavelength as $\lambda 1$ in the unregistered ONU 12a or it is also possible to use a method in which the unregistered ONU 12a sweeps wavelengths used in the WDM/TDM-PON in predetermined cycles and searches for a grant given for initial connection. In this case, the OLT 11 need not transmit an uplink grant for initial connection.

Upon receiving the registration request signal (Serial_Number_ONU PLOAM) from the ONU 12a through the wavelength $\lambda 1$, the OLT 11 performs registration of the ONU 12a. Then, the OLT 11 transmits a Ranging_Time PLOAM describing an equalization delay (EqD) which is a virtual delay time (process S23) and accommodates the ONU 12a at the wavelength $\lambda 1$.

Next, the OLT 11 transmits a wavelength switching instruction for switching a wavelength to the wavelength $\lambda 2$ to the ONU 12a through the port of the wavelength $\lambda 1$ (process S24). Upon receiving the wavelength switching instruction, the ONU 12a switches the wavelength to be used from $\lambda 1$ to $\lambda 2$, transmits a wavelength switching completion report to the OLT 11 (process S25), and starts communication. Here, the wavelength switching instruction and the wavelength switching completion report are delivered in a frame having a short length such as PLOAM. Thus, this does not become a factor causing a great delay or delay fluctuations like Quiet Window.

In the case in which a service which does not have strict delay requirements is used, the OLT 11 transmits a wavelength switching instruction for switching a wavelength to the wavelength $\lambda 1$ to the ONU 12a through the port of the wavelength $\lambda 2$ (process S26). Upon receiving the wavelength switching instruction, the ONU 12a switches the wavelength to be used to $\lambda 1$ and resumes communication (process S27).

As described above, in the second embodiment, Quiet Window is set only at the wavelength $\lambda 1$ having a margin in terms of delay requirements and no Quiet Window is set at the wavelength $\lambda 2$ which has strict delay requirements. This allows the ONU 12b which is already accommodated at the wavelength $\lambda 2$ to output an uplink signal even while the Quiet Window is open, thereby eliminating delay or delay fluctuations of uplink signals caused by the Quiet Window.

After the new ONU 12a is registered, a wavelength switching instruction for switching a wavelength to a desired wavelength $\lambda 1$ is transmitted from the OLT 11 to the ONU 12a and the wavelength of the ONU 12a is switched from $\lambda 2$ to $\lambda 1$. Thus, it is possible to provide a service which does not have strict delay requirements to the newly registered ONU 12a.

Third Embodiment

Figure 6:
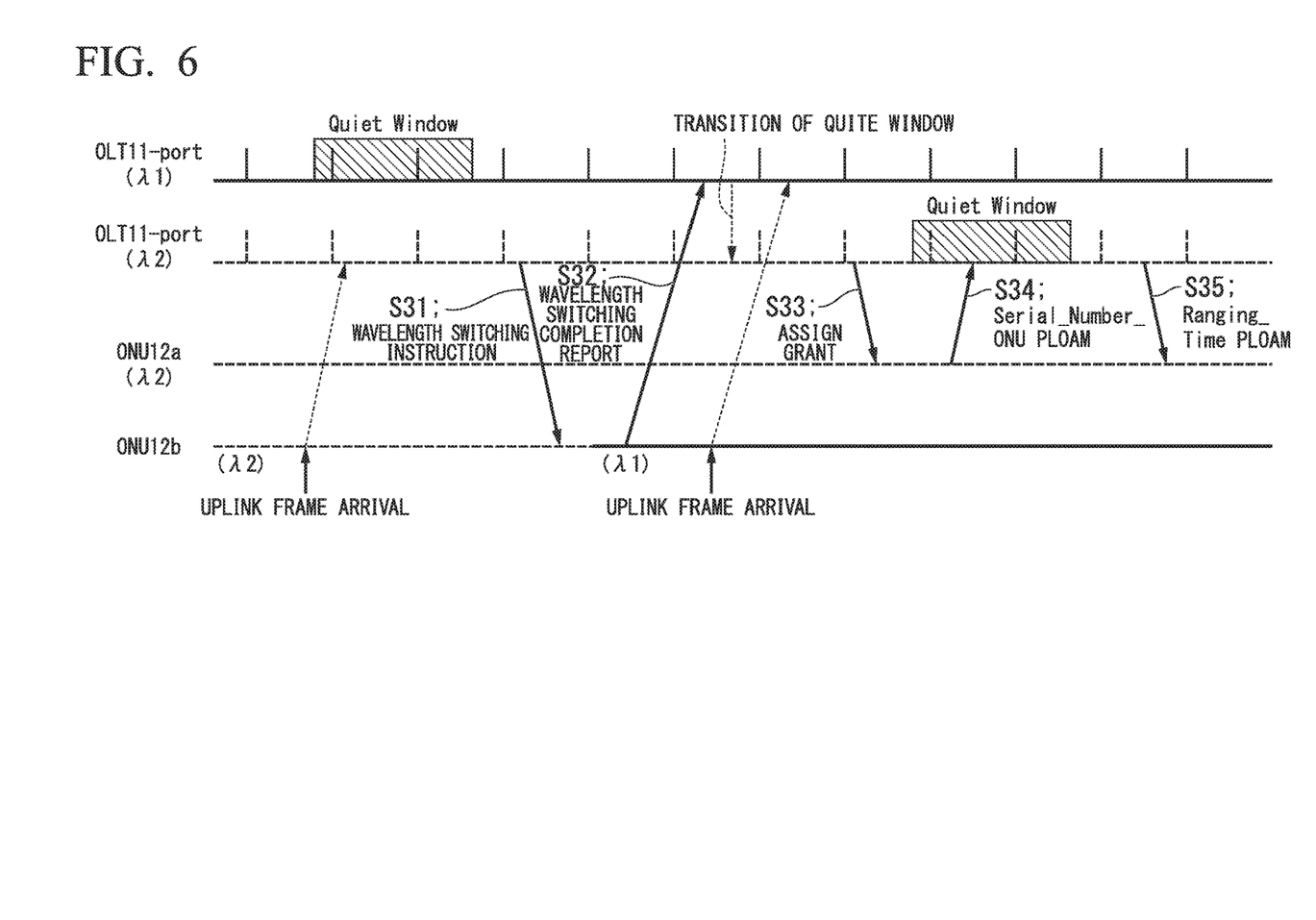
FIG. 6 is a sequence diagram of an ONU registration process in an optical communication system according to a third embodiment of the present invention.

Next, a third embodiment of the present invention will be described. FIG. 6 is a sequence diagram of an ONU registration process in the optical communication system 1 according to the third embodiment of the present invention.

Similar to the first and second embodiments, it is assumed that the ONU 12a is unregistered and the ONU 12b is registered. It is also assumed that wavelengths $\lambda 1$ and $\lambda 2$ are used as wavelengths for transmitting and receiving optical signals and the wavelength $\lambda 2$ is used for providing a service which has strict delay requirements. The wavelength $\lambda 1$ may be used for a service which does not have strict delay requirements or may not be used to provide a communication service. Further, it is assumed that the unregistered ONU 12a is not wavelength-tunable and deals with only the wavelength $\lambda 2$. It is also assumed that the ONU 12b deals with the wavelengths $\lambda 1$ and $\lambda 2$. Since the unregistered ONU 12a is not wavelength-tunable, the unregistered ONU 12a is accommodated at the wavelength $\lambda 2$.

As shown in FIG. 6, the OLT 11 transmits a wavelength switching instruction for switching a wavelength to the wavelength $\lambda 1$ to the ONU 12b through the port of wavelength $\lambda 2$ (process S31). Upon receiving the wavelength switching instruction, the ONU 12b switches the wavelength from $\lambda 2$ to $\lambda 1$ and transmits a wavelength switching completion report to the OLT 11 (process S32) and accommodates the ONU 12b at the wavelength $\lambda 1$. Thereafter, the ONU 12b performs optical communication with the OLT 11 through the wavelength λ1. Here, the wavelength switching instruction and the wavelength switching completion report are delivered in a frame having a short length such as PLOAM. Thus, this does not become a factor causing a great delay or delay fluctuations like Quiet Window.

The OLT 11 sets Quiet Window at regular intervals. Here, as shown in FIG. 6, the OLT 11 sets Quiet Window at the wavelength λ1 before wavelength switching is performed at the ONU 12b and sets Quiet Window at the wavelength λ2 after wavelength switching is performed at the ONU 12b.

The OLT 11 transmits an uplink grant for initial connection (a frame specifying the timing to transmit the Serial_number_ONU PLOAM) through the port of the wavelength λ2 (process S33). In response to the uplink grant, the unregistered ONU 12a transmits a registration request signal (Serial_Number_ONU PLOAM) such that it arrives within the Quiet Window (process S34) and issues an initial connection start request.

Upon receiving the registration request signal (Serial_Number_ONU PLOAM) from the ONU 12a through the wavelength λ2, the OLT 11 performs registration of the ONU 12a. Then, the OLT 11 transmits a Ranging_Time PLOAM describing an equalization delay (EqD) which is a virtual delay time (process S35) and accommodates the ONU 12a at the wavelength λ2.

As described above, in the third embodiment, when the wavelength of the registered ONU 12b is λ2, Quiet Window is set at the wavelength λ1. Accordingly, this does not affect uplink signals of the ONU 12b and the ONU 12b can output an uplink signal while the Quiet Window is open. After the wavelength of the registered ONU 12b is changed from λ2 to λ1, Quiet Window is set at the wavelength λ2. After the wavelength of the ONU 12b is changed from λ2 to λ1, setting the Quiet Window at the wavelength λ2 does not affect uplink signals of the ONU 12b. This allows the registered ONU 12b to output an uplink signal even while the Quiet Window is open, thereby eliminating delay or delay fluctuations of uplink signals caused by the Quiet Window.

In addition, after the wavelength of the registered ONU 12b is changed from λ2 to λ1, the Quiet Window is opened at the wavelength λ2 and therefore the unregistered ONU 12a which is not wavelength-tunable can be accommodated at λ2 which is the only wavelength used by the ONU 12a.

Similar to the first and second embodiments described above, after the new ONU 12a is registered, the wavelength of the ONU 12a can be changed to a desired wavelength by a wavelength switching instruction from the OLT 11. The wavelength of the registered ONU 12b can also be changed to a desired wavelength by a wavelength switching instruction from OLT 11. For example, if the OLT 11 transmits a wavelength switching instruction for switching a wavelength to the wavelength λ2 to the ONU 12b after the new ONU 12a is registered, it is possible to accommodate the ONU 12b again at the wavelength λ2.

Similar to the first and second embodiments, this procedure is described based on procedures described in ITU-T G987.3, but it is also possible to apply the procedure to IEEE 802.3 which opens Discovery Window instead of Quiet Window. That is, the same operation is performed by replacing the uplink grant provided for initial connection with a Discovery Gate frame, the Serial_Number_ONU PLOAM with a Register Request frame, and the Ranging_Time PLOAM with a Resister frame.

A program for performing all or some of the functions of the optical communication system 1 may be recorded on a computer readable recording medium and a process of each unit of the optical communication system 1 may be performed by allowing a computer system to read and execute the program recorded on the recording medium. The "computer system" referred to here may include an OS or hardware such as peripheral devices.

In the case in which a WWW system is used, the "computer system" also includes a webpage providing environment (or display environment).

The "computer readable recording medium" refers to a flexible disk, a magneto-optical disk, a ROM, a portable medium such as a CD-ROM, or a storage device such as a hard disk installed in the computer system. The "computer readable recording medium" also includes something which dynamically holds a program for a short time, like a communication line in the case in which the program is transmitted via the communication line such as a telephone line or via a network such as the Internet and something which holds a program for a certain period of time, like a volatile memory in a computer system which serves as a server or a client in the same case. The above program may be one for realizing some of the above-described functions and may also be one which can realize the above-described functions in combination with a program already recorded in the computer system.

Although the embodiments of the present invention have been described above in detail with reference to the drawings, specific configurations thereof are not limited to those of these embodiments and include designs or the like within a range not deviating from the gist of the present invention.

INDUSTRIAL APPLICABILITY

The present invention can also be applied to applications where it is necessary to reduce communication delay or delay fluctuations.

REFERENCE SIGNS LIST

11 OLT
12b, 12b ONU
13 Optical splitter
20 Demultiplex-multiplex unit
21a, 21b Transmission-reception unit
22 ONU registration unit
23 Communication control unit
31 Transmission-reception unit
32 Communication control unit

The invention claimed is:

1. A station-side device configured to perform transmission and reception of an optical signal to and from a subscriber-side device, the station-side device comprising:
a communication control unit configured to perform optical signal communication using a plurality of wavelengths by wavelength division multiplexing and time division multiplexing; and
a registration unit configured to set an acceptance period in at least one wavelength among the plurality of wavelengths, to perform a new registration of a subscriber-side device in response to a registration request of the subscriber-side device received within the acceptance period, and not to set the acceptance period in a wavelength other than the at least one wavelength among the plurality of wavelengths, wherein the registration unit is further configured to set the acceptance period in the at least one wavelength having a margin in terms of a delay requirement among the plurality of wavelengths, wherein the communication control unit and the registration unit are implemented by computer executable instructions executed by a computer processor.

2. The station-side device according to claim 1, wherein the communication control unit is configured to transmit a wavelength switching instruction for switching a wavelength to the at least one other wavelength to the subscriber-side device after the new registration of the subscriber-side device.

3. The station-side device according to claim 1, wherein, when the subscriber-side device uses a wavelength at which the acceptance period is not set, the communication control unit is configured to transmit a wavelength switching instruction for switching a wavelength to the wavelength at which the acceptance period is not set.

4. The station-side device according to claim 1, wherein the station-side device is configured to switch a wavelength at which the acceptance period is set.

5. A communication method performed by a station-side device configured to perform transmission and reception of an optical signal to and from a subscriber-side device, the communication method comprising:

a communication step including performing optical signal communication using a plurality of wavelengths by wavelength division multiplexing and time division multiplexing; and a registration step including setting an acceptance period in at least one wavelength among the plurality of wavelengths, performing a new registration of a subscriber-side device in response to a registration request of the subscriber-side device received within the acceptance period, and not setting the acceptance period in a wavelength other than the at least one wavelength among the plurality of wavelengths, wherein the acceptance period is set in the at least one wavelength having a margin in terms of a delay requirement among the plurality of wavelengths in the registration step, wherein the acceptance period is not set in the wavelength having no margin in terms of the delay requirement among the plurality of wavelengths in the registration step.

6. A station-side device configured to perform transmission and reception of an optical signal to and from a subscriber-side device, the station-side device comprising:

a communication control unit configured to perform optical signal communication using a plurality of wavelengths by wavelength division multiplexing and time division multiplexing; and a registration unit configured to set an acceptance period in at least one wavelength among the plurality of wavelengths, to perform a new registration of a subscriber-side device in response to a registration request of the subscriber-side device received within the acceptance period, and not to set the acceptance period in a wavelength other than the at least one wavelength among the plurality of wavelengths, wherein the registration unit is configured not to set the acceptance period in the wavelength having no margin in terms of a delay requirement among the plurality of wavelengths, wherein the communication control unit and the registration unit are implemented by computer executable instructions executed by a computer processor.

* * * * *